(No Model.)
U. HASKIN.
SPIRAL BEVEL GEAR.
No. 253,863. Patented Feb. 21, 1882.
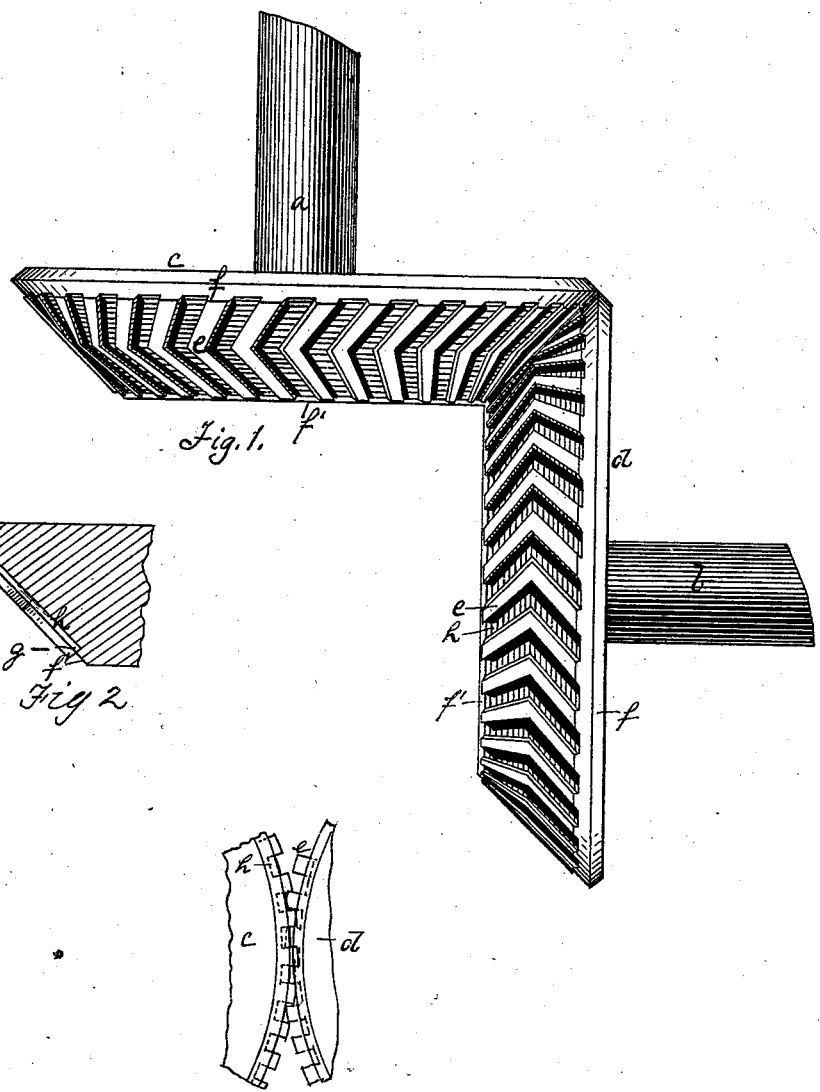
Witnesses
L. C. Fitler
Ino. K. Smith
Inventor
Uri Haskin
by his attys
Bakewell & Kerr

UNITED STATES PATENT OFFICE.

URI HASKIN, OF PITTSBURG, PENNSYLVANIA, ASSIGNOR OF ONE-HALF TO THE ATLAS WORKS, (LIMITED,) OF SAME PLACE.

SPIRAL BEVEL-GEAR.

SPECIFICATION forming part of Letters Patent No. 253,863, dated February 21, 1882.

Application filed November 25, 1881. (No model.)

*To all whom it may concern:*

Be it known that I, URI HASKIN, of Pittsburg, in the county of Allegheny and State of Pennsylvania, have invented a new and useful Improvement in Spiral Bevel-Gear; and I do hereby declare the following to be a full, clear, and exact description thereof.

My invention consists in forming the teeth of beveled-gear wheels of a double spiral form. As heretofore constructed these teeth have run radially or diagonally across the engaging faces of the wheels; but this permitted a large amount of backlash and caused an end-thrust of the shaft, which tended to throw the wheels out of gear, thereby increasing the distance between the teeth and producing an exaggerated backlash, which tended to strip the teeth from the wheels. In certain classes of machinery where a close and perfect connection is desired this has been a great objection to beveled gearing. As an instance of this we refer to the use of such gearing in the construction of universal rolling-mills, where it is applied to make the connection between the adjusting-shafts and the spindles of the vertical rolls.

To enable others skilled in the art to make and use my invention, I will now describe it with reference to the accompanying drawings, in which—

Figure 1 is a view of two miter-wheels provided with my improved teeth. Fig. 2 is a sectional view through the teeth and shrouding, and Fig. 3 is a section showing the meeting of the teeth.

The shafts are shown at $a$ and $b$, the miter-wheels at $c$ and $d$, and the double spiral gearing at $e$. The gear-wheels mesh into each other in the usual way; but the apices of the teeth coming first together have a tendency to draw the wheels to each other and make their intermeshing more perfect, while the strain, being distributed equally in two directions by the diverging lines of the teeth, does not come laterally upon the shaft which carries the wheel and cause end-thrust. As the teeth on one wheel will not leave the divergent ends of the teeth of the other wheel until the apices of the succeeding ones have come into contact, the bearing of one wheel upon the other will be continuous during its entire operation, and thereby almost, if not entirely, prevent any backlash between them.

At the ends of the teeth are shroudings $f f'$, which extend at the angle of the wheels, and the plane of which, if extended, would bisect the teeth at about half their height, so that the teeth extend above and below it. The result of this construction is that there is a shoulder, $g$, at the end of the groove $h$ between each tooth, which in case of the attempted sagging of the other wheel will catch the ends of the teeth and prevent the wheels parting. The shroudings $f'$ also act to keep the wheels together by a lever action upon each other. When in gear the shroudings of the wheels bear upon each other.

I am aware that straight pinions have heretofore been formed with diagonally-arranged teeth, and also with curved teeth, in order to obtain accuracy of motion and greater strength, and do not herein claim the same; but I am not aware that the teeth of bevel-gearing have been arranged on a double spiral, as hereinbefore set forth. In the case of a straight pinion there is no tendency to end-thrust, and the shaft or axis bears a different relation to the applied force, whereas in bevel-pinions the double spiral arrangement is material, as it causes the bevel-gearing to hug and overcomes the constant tendency to endwise motion of the shafts.

What I claim as my invention, and desire to secure by Letters Patent, is—

1. In bevel or like gearing wherein the plane of the teeth intersects that of the shaft or axis, a series of interlocking teeth arranged on intersecting or double spiral lines, substantially as and for the purpose specified.

2. A beveled-gear wheel having shroudings extending around it at the ends of the teeth, substantially as and for the purpose described.

3. A beveled-gear wheel having a shrouding extending around it at the lower end of the teeth and at a plane above the base of the teeth, substantially as and for the purpose described.

In testimony whereof I have hereunto set my hand.

URI HASKIN.

Witnesses:
J. K. SMITH,
JAMES H. PORTE.